United States Patent
Wu

(10) Patent No.: US 12,200,474 B2
(45) Date of Patent: Jan. 14, 2025

(54) DATA TRANSMISSION METHOD AND USER EQUIPMENT

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 380 days.

(21) Appl. No.: 17/586,371

(22) Filed: Jan. 27, 2022

(65) Prior Publication Data

US 2022/0150773 A1 May 12, 2022

Related U.S. Application Data

(63) Continuation of application No. PCT/CN2020/100278, filed on Jul. 3, 2020.

(30) Foreign Application Priority Data

Aug. 1, 2019 (CN) .......................... 201910708720.6

(51) Int. Cl.
*H04W 36/00* (2009.01)
*H04W 36/32* (2009.01)
*H04W 72/23* (2023.01)

(52) U.S. Cl.
CPC ....... *H04W 36/0077* (2013.01); *H04W 72/23* (2023.01); *H04W 36/00692* (2023.05); *H04W 36/324* (2023.05)

(58) Field of Classification Search
CPC ............ H04L 5/0098; H04W 28/0858; H04W 28/0861; H04W 28/09; H04W 28/18;
(Continued)

(56) References Cited

U.S. PATENT DOCUMENTS 9,867,096 B2 * 1/2018 Susitaival ......... H04W 36/0069
10,492,241 B2 * 11/2019 Pradas ............. H04W 28/0858
(Continued)

FOREIGN PATENT DOCUMENTS

CN 1878392 A 12/2006
CN 101790200 A 7/2010
(Continued)

OTHER PUBLICATIONS

European Search Report issued in corresponding application No. 20848227.3, dated Sep. 6, 2022.
(Continued)

*Primary Examiner* — Eric Nowlin
(74) *Attorney, Agent, or Firm* — BROOKS KUSHMAN P.C.

(57) ABSTRACT

A data transmission method and UE. The method includes: performing a target operation on first uplink data according to first information, where the target operation includes: in a case that the first 5 information is used to indicate that a first path is capable of transmitting uplink data, transmitting the first uplink data on the first path, and/or in a case that the first information is used to indicate that a second path is incapable of transmitting target uplink data, and that the first uplink data belongs to the target uplink data, skipping transmitting the first uplink data on the second path; and the first path is 10 a source path between the UE and a source cell, the second path is a target path between the UE and a target cell; or, the first path is the target path, and the second path is the source path.

20 Claims, 3 Drawing Sheets

(58) Field of Classification Search
CPC ......... H04W 36/0027; H04W 36/0069; H04W 36/0077; H04W 36/02; H04W 36/32; H04W 72/23; H04W 76/15; H04W 76/19; H04W 76/20; H04W 76/30

See application file for complete search history.

(56) References Cited

U.S. PATENT DOCUMENTS

| | | | | |
|---|---|---|---|---|
| 10,499,295 | B2* | 12/2019 | Susitaival | H04W 72/21 |
| 10,609,589 | B2* | 3/2020 | Loehr | H04W 36/00695 |
| 10,785,778 | B2* | 9/2020 | Lee | H04W 72/56 |
| 11,071,016 | B2* | 7/2021 | Tang | H04W 76/22 |
| 11,089,504 | B2* | 8/2021 | Lee | H04W 24/02 |
| 11,184,802 | B2* | 11/2021 | Wu | H04L 5/00 |
| 11,197,223 | B2* | 12/2021 | Kim | H04W 80/08 |
| 11,297,493 | B2* | 4/2022 | Yao | H04W 12/03 |
| 11,516,796 | B2* | 11/2022 | Pan | H04W 72/23 |
| 2009/0122730 | A1 | 5/2009 | Yang et al. | |
| 2010/0067483 | A1 | 3/2010 | Ahluwalia | |
| 2012/0057544 | A1 | 3/2012 | Xu et al. | |
| 2014/0241317 | A1 | 8/2014 | Jamadagni et al. | |
| 2015/0092630 | A1 | 4/2015 | Lin et al. | |
| 2015/0373559 | A1 | 12/2015 | Hong | |
| 2016/0255551 | A1* | 9/2016 | Susitaival | H04W 36/04 370/334 |
| 2016/0337848 | A1* | 11/2016 | Chang | H04W 12/0431 |
| 2017/0171905 | A1 | 6/2017 | Uchino et al. | |
| 2017/0272987 | A1 | 9/2017 | Han et al. | |
| 2017/0303170 | A1 | 10/2017 | Uchino et al. | |
| 2017/0318503 | A1 | 11/2017 | Chiba et al. | |
| 2018/0084464 | A1 | 3/2018 | Ozturk et al. | |
| 2018/0103402 | A1* | 4/2018 | Susitaival | H04W 72/21 |
| 2018/0167272 | A1* | 6/2018 | Wu | H04L 45/586 |
| 2018/0199225 | A1 | 7/2018 | Kim et al. | |
| 2018/0199354 | A1* | 7/2018 | Yi | H04W 28/02 |
| 2018/0302886 | A1* | 10/2018 | Pan | H04W 72/21 |
| 2018/0352556 | A1* | 12/2018 | Loehr | H04L 43/16 |
| 2019/0069308 | A1* | 2/2019 | Lee | H04W 28/085 |
| 2019/0075001 | A1* | 3/2019 | Stern-Berkowitz | H04L 5/0091 |
| 2019/0098621 | A1* | 3/2019 | Hong | H04W 72/21 |
| 2019/0132897 | A1* | 5/2019 | Pradas | H04W 28/082 |
| 2019/0215719 | A1* | 7/2019 | Wei | H04W 28/06 |
| 2020/0022046 | A1 | 1/2020 | Wang et al. | |
| 2020/0107215 | A1* | 4/2020 | Lee | H04L 45/24 |
| 2020/0205034 | A1* | 6/2020 | Tang | H04W 36/026 |
| 2020/0275314 | A1* | 8/2020 | Mattam | H04W 28/0975 |
| 2020/0367132 | A1* | 11/2020 | Kim | H04W 40/04 |
| 2020/0374690 | A1* | 11/2020 | Yao | H04W 36/0033 |
| 2021/0136626 | A1* | 5/2021 | Wu | H04W 28/0278 |
| 2022/0140861 | A1* | 5/2022 | Liu | H04W 28/082 370/228 |
| 2022/0150773 | A1* | 5/2022 | Wu | H04W 28/0858 |

FOREIGN PATENT DOCUMENTS

| | | | | |
|---|---|---|---|---|
| CN | 105009678 | A | | 10/2015 |
| CN | 106060870 | A | | 10/2016 |
| CN | 107708104 | A | | 2/2018 |
| CN | 108738157 | A * | 11/2018 | .......... H04L 1/1816 |
| CN | 109673023 | A | | 4/2019 |
| CN | 109863731 | A * | 6/2019 | ............ H04L 29/06 |
| CN | 109863731 | B * | 11/2020 | ............ H04L 29/06 |
| CN | 113424620 | A * | 9/2021 | ............ H04B 1/745 |
| CN | 108738157 | B * | 11/2021 | .......... H04L 1/1816 |
| EP | 2 389 029 | A1 | | 11/2011 |
| EP | 3 328 119 | A1 | | 5/2018 |
| EP | 2 978 261 | B1 | | 7/2019 |
| EP | 3641258 | A1 * | 4/2020 | ............ H04L 29/06 |
| EP | 3745810 | A1 * | 12/2020 | ............ H04L 45/24 |
| EP | 3641258 | B1 * | 10/2021 | ............ H04L 29/06 |
| EP | 3745810 | B1 * | 12/2022 | ............ H04L 45/24 |
| JP | 2010525618 | A | | 7/2010 |
| JP | 2016039459 | A | | 3/2016 |
| KR | 20140102112 | A | | 8/2014 |
| KR | 20180021379 | A | | 3/2018 |
| KR | 20200046372 | A * | 5/2020 | |
| KR | 20200132605 | A * | 11/2020 | |
| WO | 2014161170 | A1 | | 10/2014 |
| WO | 2015012591 | A1 | | 1/2015 |
| WO | 2015062043 | A1 | | 5/2015 |
| WO | 2016021662 | A1 | | 2/2016 |
| WO | 2018171738 | A1 | | 9/2018 |
| WO | 2018172601 | A1 | | 9/2018 |
| WO | WO-2018212535 | A1 * | 11/2018 | ............ H04L 45/24 |
| WO | WO-2019024032 | A1 * | 2/2019 | ............ H04L 29/06 |

OTHER PUBLICATIONS

Indian Examination Report issued in corresponding application No. 202227010208, dated Oct. 12, 2022.
CN Office Action in Application No. 201910708720.6 Dated Feb. 20, 2021.
CN Office Action in Application No. 201910708720.6 Dated May 17, 2021.
Written Opinion and International Search Report in Application No. PCT/CN2020/100278 Dated Oct. 12, 2020.
"3rd Generation Partnership Project; Technical Specification Group Radio Access Network; Evolved Universal Terrerstrial Radio Access Network (E-UTRAN); Extension of dual connectivity in E-UTRAN (Release 13)" 3GPP TR 36.875 v13.0.0, Jun. 2015.
JP Office Action in Application No. 2022-506173 Dated Jan. 10, 2023.
First Office Action for Korean Application No. 10-2022-7002912, dated Apr. 24, 2024, 6 Pages.
Potevio "BSR issue in architecture 3C" 3GPP TSG-RAN WG2 Meeting #84, San Francisco, USA, Nov. 2013, R2-134043, 3 Pages.
First Office Action for Singapore Application No. 11202200501Q, dated Feb. 19, 2024, 6 Pages.

* cited by examiner

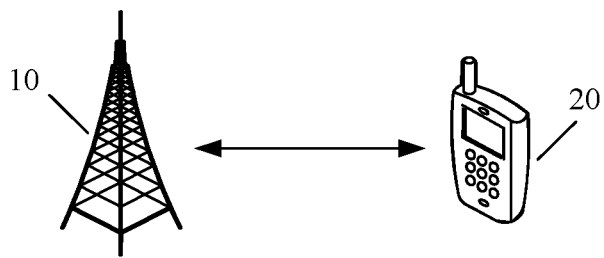

FIG. 1

| In a dual-connectivity mobility management procedure, UE performs a target operation on first uplink data according to first information | ～201 |

FIG. 2

| In a case that a transmission path for first uplink data has changed to a first path, no uplink resources are allocated to a target channel for a second path according to a target uplink grant | ～201a |
| In a dual-connectivity mobility management procedure, UE performs a target operation on first uplink data according to first information | ～201 |

FIG. 3

| In a case that UE receives a mobility management command, the UE marks a first path as a path capable of transmitting uplink data, and/or marks a second path as a path incapable of transmitting target uplink data | ～201b |
| In a dual-connectivity mobility management procedure, the UE performs a target operation on first uplink data according to first information | ～201 |

FIG. 4

DATA TRANSMISSION METHOD AND USER EQUIPMENT

CROSS-REFERENCE TO RELATED APPLICATIONS

The present application is a bypass continuation application of International Application No. PCT/CN2020/100278 filed on Jul. 3, 2020, which claims priority to Chinese Patent Application No. 201910708720.6, filed in China on Aug. 1, 2019, which is incorporated herein by reference in their entirety.

TECHNICAL FIELD

This disclosure relates to the field of communications technologies, and in particular, to a data transmission method and user equipment.

BACKGROUND

Dual-connectivity means that UE may establish a connection with each of two cell groups (that is, a master cell group (MCG) and a secondary cell group (SCG)) at the same time. The MCG includes at least a primary cell (PCell), and may further include at least one secondary cell (SCell); and the SCG includes at least a primary secondary cell (PSCell), and may further include at least one SCell. Both the PCell and the PSCell may also be referred to as a SpCell (Special Cell). In a dual-connectivity mobility procedure (for example, a handover or a secondary cell group change (SCG change)), the UE may establish a connection with both a source cell and a target cell at the same time, and then the UE releases the connection with the source cell, and only maintains the connection with the target cell.

However, in a dual-connectivity mobility management procedure, due to limitations of UE capabilities or network deployment complexity, the UE may only be capable of transmitting uplink data on one path at a same moment.

In this way, in the dual-connectivity mobility management procedure, before the UE releases the connection with the source cell, the UE maintains connection with the source cell and the target cell at the same time, so that in this case, if an uplink data transmission path selected by the UE cannot transmit uplink data, the uplink data transmission may be interrupted or delayed.

SUMMARY

Embodiments of this disclosure provide a data transmission method and user equipment, to resolve a problem in a dual-connectivity mobility management procedure that an uplink data transmission is interrupted or delayed.

To resolve the foregoing technical problem, this disclosure is implemented as follows.

According to a first aspect, an embodiment of this disclosure provides a data transmission method, applied to UE, and the method includes: performing a target operation on first uplink data according to first information in a dual-connectivity mobility management procedure, where the target operation includes: in a case that the first information is used to indicate that a first path is capable of transmitting uplink data, transmitting the first uplink data on the first path, and/or in a case that the first information is used to indicate that a second path is incapable of transmitting target uplink data, and that the first uplink data belongs to the target uplink data, skipping transmitting the first uplink data on the second path; and the first path is a source path between the UE and a source cell, the second path is a target path between the UE and a target cell; or, the first path is the target path, and the second path is the source path.

According to a second aspect, an embodiment of this disclosure provides UE, including: an execution module, configured to perform a target operation on first uplink data according to first information in a dual-connectivity mobility management procedure, where the target operation includes: in a case that the first information is used to indicate that a first path is capable of transmitting uplink data, transmitting the first uplink data on the first path, and/or in a case that the first information is used to indicate that a second path is incapable of transmitting target uplink data, and that the first uplink data belongs to the target uplink data, skipping transmitting the first uplink data on the second path; and the first path is a source path between the UE and a source cell, the second path is a target path between the UE and a target cell, or, the first path is the target path, and the second path is the source path.

According to a third aspect, an embodiment of this disclosure provides UE, including a processor, a memory, and a computer program stored in the memory and capable of running on the processor, where when the computer program is executed by the processor, the steps of the data transmission method according to the first aspect are implemented.

According to a fourth aspect, an embodiment of this disclosure provides a computer-readable storage medium, where the computer-readable storage medium stores a computer program, and when the computer program is executed by a processor, the steps of the foregoing data transmission method are implemented.

BRIEF DESCRIPTION OF DRAWINGS

FIG. 1 is a possible schematic structural diagram of a communications system in an embodiment of this disclosure;

FIG. 2 is a first schematic flowchart of a data transmission method according to an embodiment of this disclosure;

FIG. 3 is a second schematic flowchart of a data transmission method according to an embodiment of this disclosure;

FIG. 4 is a third schematic flowchart of a data transmission method according to an embodiment of this disclosure;

DESCRIPTION OF EMBODIMENTS

Figure 5:
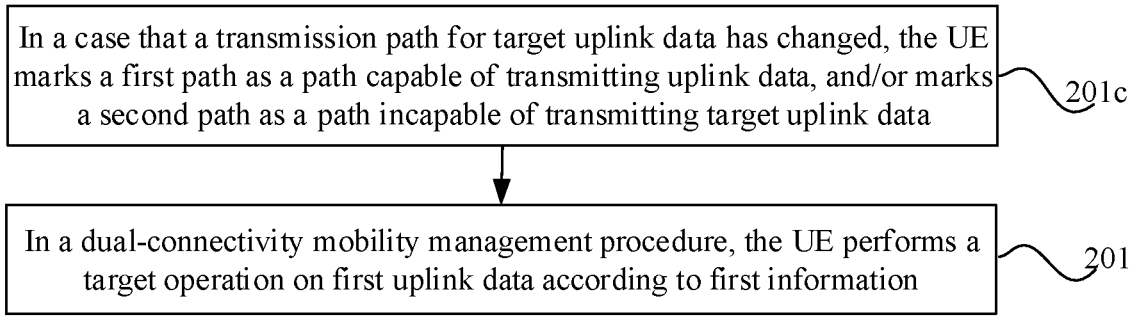
FIG. 5 is a fourth schematic flowchart of a data transmission method according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

"/" in the embodiments of this disclosure represents or, for example, AB may represent A or B; and that the term "and/or" in this specification describes only an association relationship for describing associated objects and represents that three relationships may exist, for example, A and/or B may represent the following three cases: A alone, both A and B, and B alone.

To clearly describe the technical solutions in the embodiments of this disclosure, terms, such as "first" and "second", are used in the embodiments of this disclosure to distinguish between same items or similar items that have a basically same function or usage. A person skilled in the art may understand that the terms, such as "first" and "second", are not intended to limit a quantity or an execution sequence. For example, a first timer and a second timer are used to distinguish different timers, but not to describe a specific order of the timers.

In the embodiments of this disclosure, terms such as "example" or "for example" are used to represent an example, an instance, or an illustration. Any embodiment or design solution described as "an example" or "for example" in the embodiments of this disclosure shall not be interpreted to be more preferential or advantageous than other embodiments or design solutions. To be precise, the terms such as "example" or "for example" are intended to present a related concept in a specific manner. "Of", "corresponding or relevant", and "corresponding" herein may be interchangeably used sometimes. It should be noted that expressed meanings are consistent when differences are not emphasized.

In the description of the embodiments of this disclosure, unless otherwise specified, "plurality" means at least two, for example, a plurality of processing units mean two or more processing units, and a plurality of components mean two or more components.

The technical solutions provided in this disclosure can be applied to various communications systems such as a 5G communications system, a future evolved system, or a plurality of communication fusion systems. A plurality of application scenarios may be included, such as machine to machine (M2M), D2D, macro-micro communications, enhanced mobile Internet (enhance Mobile Broadband, eMBB), ultra reliable and low latency communications (ultra Reliable & Low Latency Communication, uRLLC), and massive machine type communications (mMTC). These scenarios include but are not limited to communication between UEs, communication between network devices, and communication between a network device and UE. The embodiments of this disclosure may be applied to communication between a network device and UE, or between UEs, or between network devices in a 5G communications system.

FIG. 1 is a possible schematic structural diagram of a communications system in an embodiment of this disclosure. As shown in FIG. 1, the communications system includes at least one network device 10 (only one is shown in FIG. 1 as an example) and one or more UE 20 (only one is shown in FIG. 1 as an example) to which each network device 10 is connected.

The at least one network device 10 may serve at least one cell group (such as an MCG or SCG). One MCG at least includes one PCell, and may further include at least one SCell; and one MCG includes at least one PSCell, and may further include at least one SCell.

For example, the communications system shown in FIG. 1 may be a multi-carrier communications system, such as a carrier aggregation (CA) scenario or a dual-connectivity (DC) scenario, which is not limited in this embodiment of this disclosure.

The network device 10 may be a base station, a core network device, a transmission and reception point (TRP), a relay station, an access point, or the like. The network device 10 may be a base transceiver station (BTS) in a global system for mobile communications (GSM) or code division multiple access (CDMA) network, may be an NB (NodeB) in wideband code division multiple access (WCDMA), or may be an eNB or eNodeB (evolved NodeB) in LTE. The network device 10 may alternatively be a wireless controller in a cloud radio access network (CRAN) scenario. The network device 10 may alternatively be a network device in a 5G communications system or a network device in a future evolved network. However, the terms do not constitute a limitation on this disclosure.

The UE 20 may be a terminal device, and the terminal device may be a wireless terminal device or a wired terminal device. The wireless terminal device may be a device that provides voice and/or other service data connectivity to a user, a handheld device having a wireless communication function, a computing device or other processing devices connected to a wireless modem, an in-vehicle device, a wearable device, a terminal device in a future 5G network, a terminal device in a future evolved PLMN network, or the like. The wireless terminal device may communicate with one or more core networks through a radio access network (RAN). The wireless terminal device may be a mobile terminal device, such as a mobile phone (also referred to as a "cellular" phone) and a computer provided with a mobile terminal device, for example, may be a portable mobile apparatus, a pocket-sized mobile apparatus, a handheld mobile apparatus, a computer built-in mobile apparatus, or an in-vehicle mobile apparatus that exchanges voice and/or data with the radio access network, and a device such as a personal communications service (PCS) phone, a cordless telephone set, a session initiation protocol (SIP) phone, a wireless local loop (WLL) station, or a personal digital assistant (PDA). The wireless terminal device may also be a mobile device, a UE terminal device, an access terminal device, a wireless communications device, a terminal device unit, a terminal device station, a mobile station, a mobile, a remote station, a remote terminal unit, a remote terminal, a subscriber unit, a subscriber station, a user agent, a terminal device apparatus, or the like. As an example, in this embodiment of this disclosure, the UE shown in FIG. 1 is a mobile phone.

Currently in the related art, in a dual-connectivity mobility management procedure, due to limitations of UE capabilities or network deployment complexity, the UE may only be capable of transmitting uplink data on one path at a same moment. In this way, before the UE releases the connection with the source cell, the UE maintains connection with the source cell and the target cell at the same time, causing that the UE may transmit uplink data on a path incapable of transmitting uplink data, and further resulting in uplink data transmission interruption or delay.

To resolve the foregoing technical problem, the embodiments of this disclosure provide a data transmission method and a device. In a dual-connectivity mobility management procedure, UE performs a target operation on first uplink data according to first information, which means that in a case that the first information is used to indicate that a first path is capable of transmitting uplink data, the UE transmits the first uplink data on the first path, and in a case that the first information is used to indicate that a second path is incapable of transmitting target uplink data, and that the first uplink data belongs to the target uplink data, the UE skips transmitting the first uplink data on the second path. In this way, the UE determines whether the source path or the target path is capable of transmitting uplink data based on the first information, so that the uplink data are transmitted only on one path at a same moment, avoiding uplink data transmission interruption and delay.

The following describes in detail a data transmission method and a user equipment provided in the embodiments of this disclosure through specific embodiments and application scenarios thereof with reference to the accompanying drawings.

According to the foregoing content, an embodiment of this disclosure provides a data transmission method. As shown in FIG. 2, the data transmission method may include step 201.

Step 201: In a dual-connectivity mobility management procedure, UE performs a target operation on first uplink data according to first information.

In this embodiment of this disclosure, the target operation includes: in a case that the first information is used to indicate that a first path is capable of transmitting uplink data, transmitting the first uplink data on the first path, and/or in a case that the first information is used to indicate that a second path is incapable of transmitting target uplink data, and that the first uplink data belongs to the target uplink data, skipping transmitting the first uplink data on the second path.

In this embodiment of this disclosure, the first path is a source path (that is a path between the UE and a source cell), and the second path is a target path (that is a path between the UE and a target cell); or the first path is the target path, and the second path is the source path. It can be understood that the source path may be referred to as a source connection (a connection established between the UE and the source cell), and the target path may be referred to as a target connection (that is, a connection established between the UE and the target cell).

In this embodiment of this disclosure, the dual-connectivity mobility procedure includes a handover procedure or an SCG change procedure (that is, SCG change procedure). To be specific, when the UE changes its serving cell, the UE establishes connection with both a source cell and a target cell, then releases the connection with the source cell, and only maintains the connection with the target cell. For example, in the handover procedure, a PCell serving cell of the UE changes from cell 1 to cell 2. In the change procedure, the UE establishes connection with both the cell 1 and the cell 2, then releases the connection with the cell 1, and only maintains the connection with the cell 2.

In this embodiment of this disclosure, before the UE releases the connection with the source cell, the UE can only transmit uplink data on one of the source connection and the target connection at a same moment. In this way, at the same moment, one of the two connections of the UE (the source connection or the target connection) is a connection capable of transmitting uplink data, and the other connection (the target connection or the source connection) is a connection incapable of transmitting the target uplink data.

Optionally, in this embodiment of this disclosure, a data type of the target uplink data includes any one of the following: PDCP (Packet Data Convergence Protocol) layer data packet, PDCP layer control packet, and PDCP layer data. The PDCP layer data packet may be a PDCP Data PDU, the PDCP layer control packet may be a PDCP control PDU (such as a robust header compression (ROHC) feedback packet), and the PDCP layer data may be a PDCP PDU.

In an example, the PDCP layer data (such as PDCP PDU) includes but is not limited to: signaling radio bearer (SRB) control packet, SRB data packet, data radio bearer (SRB) control packet, DRB data packet, PDCP control packet, and PDCP data packet.

In an example, a data type of the target uplink data includes any one of the following: PDCP layer data packet of a data bearer, PDCP layer control packet of a data bearer, and PDCP layer data of a data bearer.

For example, if the target connection or the source connection is a connection incapable of transmitting the target uplink data, the UE cannot transmit uplink PDCP Data PDUs on the target connection or the source connection; if the target connection or the source connection is a connection incapable of transmitting the target uplink data, the UE cannot transmit PDCP PDUs of an uplink DRB on the target connection or the source connection; and if the target connection or the source connection is a connection incapable of transmitting the target uplink data, the UE cannot transmit PDCP Data PDUs of an uplink DRB on the target connection or the source connection.

Optionally, in an embodiment of this invention, in a case that the first information is used to indicate that a second path is incapable of transmitting target uplink data, the first information is specifically used to indicate that no uplink resources can be allocated to a target channel for the second path.

Optionally, in an embodiment of this invention, in a case that the first information is used to indicate that a second path is incapable of transmitting target uplink data, when the second path is the source path, the target channel includes a logical channel for a data bearer of the source path and/or a logical channel for a signaling bearer of the source path; or, when the second path is the target path, the target channel includes a logical channel for a data bearer of the target path.

Optionally, with reference to FIG. 2, as shown in FIG. 3, in an embodiment of this invention, in a case that the first information is used to indicate that a second path is incapable of transmitting target uplink data, before the step 201, the data transmission method provided in this embodiment of this disclosure further includes step 201*a*.

Step 201*a*: In a case that a transmission path for first uplink data has changed to a first path, no uplink resources are allocated to a target channel for a second path according to a target uplink grant.

The target uplink grant is used to indicate an uplink resource for the second path.

For example, the target channel refers to a logical channel.

For example, in a case that a transmission path for the first uplink data has changed to the first path, a MAC entity of the UE may allocate no uplink resources to a target channel for the second path according to the target uplink grant. Certainly, in practical applications, another entity of the UE may alternatively be used to implement the procedure, which is not limited in this embodiment of this disclosure.

For example, after receiving an uplink grant, a MAC entity of the UE allocates no uplink resources to "a target channel incapable of transmitting uplink data" through restriction by a logical channel prioritization (LCP) procedure.

Example a1: The UE currently can transmit uplink data only through the source connection, and "a logical channel incapable of transmitting uplink data" of the UE refers to a logical channel for a DRB corresponding to the target connection. After the UE receives uplink grant 1 for the target connection, a MAC entity of the UE allocates no uplink transmission resource to the logical channel for the DRB of the target connection when allocating uplink resources, but can still allocate uplink resources to a logical channel for the SRB, where the uplink grant 1 indicates an uplink transmission resource for the target connection.

Example a2: The UE currently can transmit uplink data only through the target connection, and "a logical channel incapable of transmitting uplink data" of the UE refers to logical channels of all RBs (including DRBs and SRBs) corresponding to the source connection. After the UE receives uplink grant 1 for the source connection, a MAC entity of the UE allocates no uplink transmission resource to the logical channels for the RBs to which the source connection is connected when allocating uplink resources, where the uplink grant 1 indicates an uplink transmission resource for the target connection.

Optionally, in this embodiment of this disclosure, the first information includes: a path ID of the first path and/or a path ID of the second path, where the path ID of the first path is used to identify the first path as a path capable of transmitting uplink data, and the path ID of the second path is used to identify the second path as a path incapable of transmitting the target uplink data.

Optionally, with reference to FIG. 2, as shown in FIG. 4, in this embodiment of this disclosure, before step 201, the method further includes step 201b.

Step 201b: In a case that UE receives a mobility management command, the UE marks a first path as a path capable of transmitting uplink data, and/or marks a second path as a path incapable of transmitting target uplink data.

The first path is a path capable of transmitting uplink data by default, and the second path is a path incapable of transmitting the target uplink data by default.

For example, the mobility management command includes: a handover command, an SCG change command, and the like.

Optionally, with reference to FIG. 2, as shown in FIG. 5, in this embodiment of this disclosure, before step 201, the data transmission method provided in this embodiment of this disclosure further includes step 201c.

Step 201c: In a case that a transmission path for target uplink data has changed, the UE marks a first path as a path capable of transmitting uplink data, and/or marks a second path as a path incapable of transmitting target uplink data.

The first path is a path previously incapable of transmitting uplink data, and the second path is a path previously capable of transmitting target uplink data. For example, in a case that the UE receives a mobility management command, the UE marks the source path as a path capable of transmitting uplink data, and/or marks the target path as a path incapable of transmitting the target uplink data. Next, after a transmission path for the target uplink data has changed, the UE marks the source path (that is, the path previously incapable of transmitting uplink data) as a path incapable of transmitting the target uplink data, and marks the target path (that is, the path previously incapable of transmitting the target uplink data) as a path capable of transmitting uplink data.

For example, for step 201b and step 201c, the marking the first path as a path capable of transmitting uplink data may specifically means that: a PDCP entity of the UE marks the first path as a path capable of transmitting uplink data; and the marking the second path as a path incapable of transmitting the target uplink data may specifically means that: a PDCP entity of the UE marks the second path as a path incapable of transmitting the target uplink data. Certainly, in practical applications, another entity of the UE may alternatively be used to implement the procedure, which is not limited in this embodiment of this disclosure.

For example, the PDCP entity of the UE marks the uplink transmission path as "an uplink transmission path capable of transmitting uplink data" or "an uplink path incapable of transmitting uplink data". When the PDCP entity receives data transmission indication information from an lower layer and the data transmission indication information is data transmission indication information corresponding to "an uplink path incapable of transmitting uplink data", the PDCP entity of the UE does not generate or transmit data to the "the uplink path incapable of transmitting uplink data".

Example b1: A DRB of the UE currently can transmit uplink data only through the source connection, so that a PDCP entity of the DRB marks the target connection as "an uplink path incapable of transmitting uplink data". When the UE receives an uplink grant for the target connection, a MAC entity of the UE allocates an uplink resource for use by the target connection for the DRB and instructs the PDCP entity of the DRB to transmit data to the target connection. In this case, the PDCP entity of the DRB of the UE does not generate or transmit uplink data to the target connection.

Example b2: A DRB of the UE currently can transmit uplink data only through the target connection, so that a PDCP entity of the DRB marks the source connection as "an uplink path incapable of transmitting uplink data". When the UE receives an uplink grant for the source connection, a MAC entity of the UE allocates an uplink resource for use by the source connection for the DRB and instructs the PDCP entity of the DRB to transmit data to the source connection. In this case, the PDCP entity of the DRB of the UE does not generate or transmit uplink data to the target connection.

For example, when the MAC entity/RRC entity of the UE receives information for uplink path change, the MAC/RRC entity indicates the transmission path for uplink data of a target PDCP entity.

Example b3: When the UE receives a DC handover RRC message, an RRC entity of the UE indicates that a transmission path for uplink data of a PDCP entity of a DRB is a source path, and the PDCP entity of the DRB of the UE marks the source connection as "an uplink path capable of transmitting uplink data", and marks a target path as "an uplink path incapable of transmitting uplink data".

Example b4: After a successful random access of a target connection, or a successful handover, or a successful SCG change, and after a MAC entity of the UE receives an uplink grant for changing a transmission path for uplink data from a source path to a target path, the MAC entity of the UE indicates that a transmission path for uplink data of a PDCP entity of a DRB is the target path, then the PDCP entity of the DRB of the UE marks the source path as "an uplink transmission path incapable of transmitting uplink data", and marks the target path as "an uplink path capable of transmitting uplink data".

In this embodiment of this disclosure, in a dual-connectivity mobility management procedure, the UE performs a target operation on first uplink data according to first information, which means that in a case that the first information is used to indicate that a first path is capable of transmitting uplink data, the UE transmits the first uplink data on the first path, and in a case that the first information is used to indicate that a second path is incapable of transmitting target uplink data, and that the first uplink data belongs to the target uplink data, the UE skips transmitting the first uplink data on the second path. In this way, the UE determines whether the source path or the target path is capable of transmitting uplink data based on the first information, so that the uplink data are transmitted only on one path at a same moment, avoiding uplink data transmission interruption and delay.

Optionally, in an embodiment of this invention, in a dual-connectivity mobility management procedure, the procedure of the UE transmitting the first uplink data on the first path specifically includes the following step 301a.

Step 301a: After a PDCP entity of the UE receives an uplink data transmission indication from an lower layer entity, the UE transmits first uplink data on a first path.

For example, the lower layer entity of the PDCP entity of the UE may be an RRC entity or a MAC entity.

For example, in a case that a first path is a target path, according to configuration by a network or prescription by a protocol, in a dual-connectivity mobility management procedure performed by a PDCP entity of the UE, the PDCP entity of the UE cannot transmit uplink data to the target path without receiving uplink data transmission indication from an lower layer entity (for example, uplink data transmission indication information indicated by a MAC entity to the PDCP entity after the MAC entity has received an uplink grant and allocated a resource to a target logical channel).

For example, in a case that a first path is a target path, according to configuration by a network or prescription by a protocol, in a dual-connectivity mobility management procedure performed by a PDCP entity of UE, when the target path is "an uplink transmission path incapable of transmitting uplink data", the PDCP entity of the UE is not allowed to transmit uplink data to the target path without receiving uplink data transmission indication from an lower layer entity; and/or, when the target path is "an uplink transmission path capable of transmitting uplink data", the PDCP entity of the UE is allowed to transmit uplink data to the target path without receiving uplink data transmission indication from an lower layer entity.

In this embodiment of this disclosure, in a dual-connectivity mobility management procedure performed by UE, the UE cannot transmit uplink data to a first path without receiving uplink data transmission indication from an lower layer entity, thereby ensuring a successful uplink data transmission.

Optionally, in an embodiment of this invention, after the dual-connectivity mobility management procedure, the procedure of the UE transmitting the first uplink data on the first path specifically includes the following step 301b.

Step 301b: In a case that a PDCP entity of the UE receives no uplink data transmission indication from an lower layer entity, the UE transmits the first uplink data on the first path.

The after the dual-connectivity mobility management procedure includes any one of the following: successful completion of a random access to the target cell, completion of a handover, completion of an SCG change, and release by the UE of a connection with the source cell.

For example, the lower layer entity of the PDCP entity of the UE may be an RRC entity or a MAC entity.

For example, in a case that a first path is a target path, according to configuration by a network or prescription by a protocol, after a dual-connectivity mobility management procedure by a PDCP entity of UE, the PDCP entity of the UE is allowed to transmit uplink data to the target path without receiving uplink data transmission indication from an lower layer entity.

In this embodiment of this disclosure, after the dual-connectivity mobility management procedure performed by UE, the UE re-allows uplink data to be transmitted to a first path without receiving uplink data transmission indication from an lower layer entity, thereby reducing uplink data transmission delay.

Optionally, in this embodiment of this disclosure, in a case that a PDCP entity of the UE buffers second data and third data, that the second data is data transmitted through the first path, and that the third data is data transmitted through the second path, the data transmission method provided in this embodiment of this disclosure further includes the following step 401a or step 401b.

401a: The UE transmits second information on a first path and transmits third information on a second path.

401b: The UE transmits second information on a first path.

The second information is used to indicate a data amount of the second data, and the third information is used to indicate a data amount of the third data.

For example, when a PDCP entity of the UE contains uplink data for a source connection and uplink data for a target connection, the PDCP entity distinguishes the different connections, collects data amounts for the different connections, and indicates them to a MAC entity of a corresponding connection.

For example, a method of indicating data for different connections to a MAC entity of a corresponding connection includes the following examples.

Example 1: For a path capable of transmitting uplink data, a PDCP entity of the UE indicates to a MAC entity corresponding to the path capable of transmitting uplink data an amount of data that are buffered by the PDCP of the path and are to be transmitted through the path. For a path incapable of transmitting uplink data, a PDCP entity of the UE does not indicate to a MAC entity corresponding to the path incapable of transmitting uplink data an amount of data that are buffered by the PDCP of the path for transmission through the path. Correspondingly, the corresponding MAC entity may generate a corresponding buffer status report (BSR) according to the amount of data indicated by the PDCP entity.

Example c1: Connections corresponding to a PDCP entity of one DRB include a source connection (for example, logical channel 1 of a source cell group) and a target connection (for example, logical channel 2 of a target cell group), where the source connection corresponds to a source MAC entity, and the target connection corresponds to a target MAC entity. A connection of the PDCP entity of the DRB that currently is capable of transmitting data is the source connection, and a connection of the PDCP entity of the DRB that currently is incapable of transmitting data is the target connection. Therefore, data packets generated by the PDCP entity for the source connection includes: PDCP data PDUs and PDCP Control PDUs that are to be transmitted through the source connection, and data packets generated by the PDCP entity for the target connection include: PDCP Control PDUs that is to be transmitted through the target connection. In this case, the PDCP entity collects an amount of data transmitted through the source connection and indicates the amount to a source MAC entity, and does not indicate an amount of data transmitted through the target connection to a target MAC entity.

Example 2: For a connection capable of transmitting uplink data, a PDCP entity of the UE indicates to a MAC entity corresponding to the connection capable of transmitting uplink data an amount of data that are buffered by the PDCP of the connection for transmission through the path. For a connection incapable of transmitting uplink data, a PDCP entity of the UE still first indicates to a MAC entity corresponding to the connection incapable of transmitting uplink data an amount of data that are buffered by the PDCP of the connection for transmission through the connection.

The MAC entity generates a corresponding BSR (Buffer Status Report) according to the amount of data indicated by the PDCP.

Example c2: Connections corresponding to a PDCP entity of one DRB include a source connection (for example, logical channel 1 of a source cell group) and a target connection (for example, logical channel 2 of a target cell group), where the source connection corresponds to a source MAC entity, and the target connection corresponds to a target MAC entity. A connection of the PDCP entity of the DRB that currently is capable of transmitting data is the source connection, and a connection of the PDCP entity of the DRB that currently is incapable of transmitting data is the target connection. Therefore, data packets generated by the PDCP entity of the DRB for the source connection includes: PDCP data PDUs and PDCP Control PDUs that are to be transmitted through the source connection, and data packets generated by the PDCP entity of the DRB for the target connection include: PDCP Control PDUs (such as a ROHC feedback packet) that is to be transmitted through the target connection. In this case, the PDCP entity of the DRB collects an amount of data transmitted through the source connection and indicates the amount to a source MAC entity, and collects and indicates to a target MAC entity an amount of data transmitted through the target connection.

It should be noted that in this embodiment of this disclosure, an execution order between steps 201a and 201b is not limited, nor an execution order between steps 201a, 201b, and 401a is limited, nor an execution order between steps 201a, 201b, and 401b is limited. This is not limited in this embodiment of this disclosure.

It should be noted that the data transmission method provided in this embodiment of this disclosure can be implemented through the foregoing step 201 or through a combination scheme by combining step 201 and at least one of the foregoing steps 201a, 201b, 301a, 301b, 401a, and 401b. This is not limited in this embodiment of this disclosure.

Figure 6:
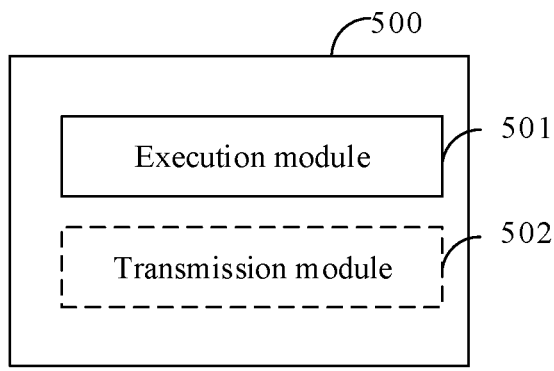
FIG. 6 is a schematic structural diagram of UE according to an embodiment of this disclosure.

As shown in FIG. 6, an embodiment of this disclosure provides UE. The UE 500 includes an execution module 501, where the execution module 501 is configured to perform a target operation on first uplink data according to first information in a dual-connectivity mobility management procedure, where the target operation includes: in a case that the first information is used to indicate that a first path is capable of transmitting uplink data, transmitting the first uplink data on the first path, and/or in a case that the first information is used to indicate that a second path is incapable of transmitting target uplink data, and that the first uplink data belongs to the target uplink data, skipping transmitting the first uplink data on the second path; and the first path is a source path between the UE and a source cell, the second path is a target path between the UE and a target cell, or, the first path is the target path, and the second path is the source path.

Optionally, in a case that the first information is used to indicate that the second path is incapable of transmitting the target uplink data, the foregoing first information is specifically used to indicate that no uplink resources can be allocated to a target channel for the second path.

Optionally, in a case that the second path is the source path, the foregoing target channel includes a logical channel for a data bearer of the source path and/or a logical channel for a signaling bearer of the source path; or, in a case that the second path is the target path, the target channel includes a logical channel for a data bearer of the target path.

Optionally, the execution module 501 is further configured to: in a case that a transmission path for the first uplink data has changed to the first path, allocate no uplink resources to a target channel for the second path according to a target uplink grant, where the target uplink grant is used to indicate an uplink resource for the second path.

Optionally, the execution module 501 is further configured to: in a case that the UE 500 receives a mobility management command, mark the first path as a path capable of transmitting uplink data, and/or mark the second path as a path incapable of transmitting the target uplink data, where the first path is a path capable of transmitting uplink data by default, and the second path is a path incapable of transmitting the target uplink data by default.

Optionally, the execution module 501 is further configured to: in a case that a transmission path for the target uplink data has changed, mark the first path as a path capable of transmitting uplink data, and/or mark the second path as a path incapable of transmitting the target uplink data, where the first path is a path previously incapable of transmitting uplink data, and the second path is a path previously capable of transmitting target uplink data.

Optionally, as shown in FIG. 6, the UE 500 further includes a transmission module 502, where the transmission module 502 is configured to: after a PDCP entity the UE 500 receives an uplink data transmission indication from an lower layer entity, transmit first uplink data on a first path.

Optionally, the transmission module 502 is configured to: after the dual-connectivity mobility management procedure, in a case that the PDCP entity of the UE 500 receives no uplink data transmission indication from the lower layer entity, transmit the first uplink data on the first path, where the after the dual-connectivity mobility management procedure includes any one of the following: successful completion of a random access to the target cell, completion of a handover, completion of an SCG change, and release by the UE 500 of a connection with the source cell.

Optionally, the transmission module 502 is configured to: in a case that a PDCP entity of the UE 500 buffers second data and third data, that the second data is data transmitted through the first path, and that the third data is data transmitted through the second path, transmit second information on the first path and transmit third information on the second path, where the second information is used to indicate a data amount of the second data, and the third information is used to indicate a data amount of the third data.

Optionally, a data type of the foregoing target uplink data includes any one of the following: PDCP layer data packet, PDCP layer control packet, and PDCP layer data.

Optionally, the PDCP layer data packet is a PDCP layer data packet of a data bearer; and/or the PDCP layer data packet is a PDCP layer control packet of a data bearer; and/or the PDCP layer data packet is PDCP layer data of a data bearer.

It should be noted that, as shown in FIG. 6, the module that must be included in the UE 500 is indicated by a solid line frame, such as the execution module 501; and the module that may or may not be included in the UE 500 is indicated by a dashed frame, such as the transmission module 502.

The terminal device provided in this embodiment of this disclosure can implement all procedures in the foregoing method embodiment. To avoid repetition, details are not described herein again.

For the UE provided in this embodiment of this disclosure, in a dual-connectivity mobility management procedure, the UE performs a target operation on first uplink data according to first information, which means that in a case that the first information is used to indicate that a first path is capable of transmitting uplink data, the UE transmits the first uplink data on the first path, and in a case that the first information is used to indicate that a second path is incapable of transmitting target uplink data, and that the first uplink data belongs to the target uplink data, the UE skips transmitting the first uplink data on the second path. In this way, the UE determines whether the source path or the target path is capable of transmitting uplink data based on the first information, so that the uplink data are transmitted only on one path at a same moment, avoiding uplink data transmission interruption and delay.

Figure 7:
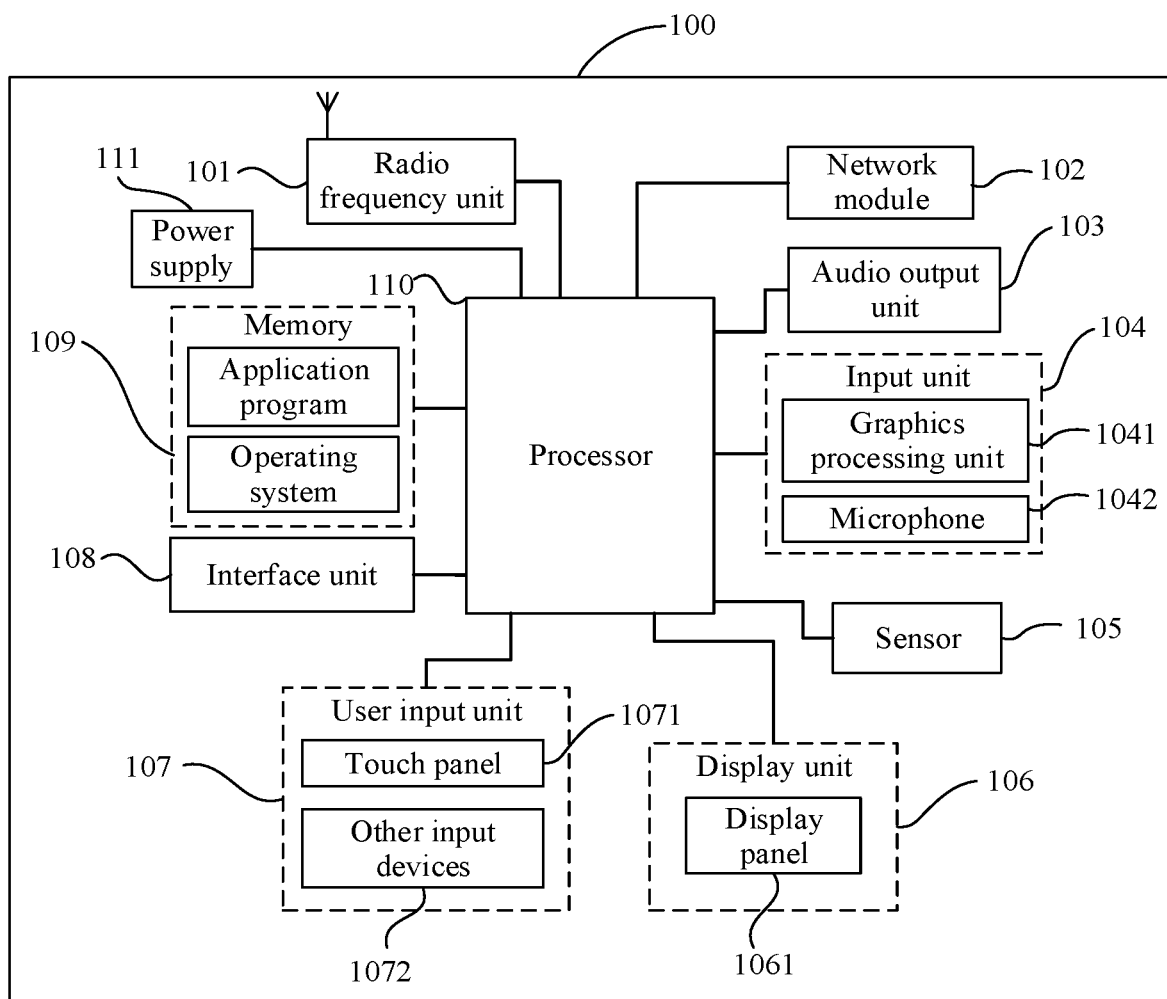
FIG. 7 is a schematic diagram of a hardware structure of a terminal device according to an embodiment of this disclosure.

With UE as an example of a terminal device, FIG. 7 is a schematic diagram of a hardware structure of a terminal device for implementing the embodiments of this disclosure. The terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. Persons skilled in the art can understand that the structure of the terminal device 100 shown in FIG. 7 does not constitute any limitation on the terminal device. The terminal device 100 may include more or fewer components than those shown in the figure, or combine some components, or arrange the components differently. In this embodiment of this disclosure, the terminal device 100 includes but is not limited to a mobile phone, a tablet computer, a laptop computer, a palmtop computer, an in-vehicle terminal device, a wearable device, a pedometer, and the like.

The processor 110 is configured to perform a target operation on first uplink data according to first information in a dual-connectivity mobility management procedure, where the target operation includes: in a case that the first information is used to indicate that a first path is capable of transmitting uplink data, transmitting the first uplink data on the first path, and/or in a case that the first information is used to indicate that a second path is incapable of transmitting target uplink data, and that the first uplink data belongs to the target uplink data, skipping transmitting the first uplink data on the second path; and the first path is a source path between the UE and a source cell, the second path is a target path between the UE and a target cell, or, the first path is the target path, and the second path is the source path.

For the terminal device provided in this embodiment of this disclosure, in a dual-connectivity mobility management procedure, the terminal device performs a target operation on first uplink data according to first information, which means that in a case that the first information is used to indicate that a first path is capable of transmitting uplink data, the terminal device transmits the first uplink data on the first path, and in a case that the first information is used to indicate that a second path is incapable of transmitting target uplink data, and that the first uplink data belongs to the target uplink data, the terminal device skips transmitting the first uplink data on the second path. In this way, the terminal device determines whether the source path or the target path is capable of transmitting uplink data based on the first information, so that the uplink data are transmitted only on one path at a same moment, avoiding uplink data transmission interruption and delay.

It should be understood that, in this embodiment of this disclosure, the radio frequency unit 101 may be configured to transmit or receive a signal in an information transmitting/receiving or call process. Specifically, the radio frequency unit 101 receives downlink data from a base station, transmits the downlink data to the processor 110 for processing, and transmits uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and other devices via a wireless communications system.

The terminal device 100 provides a user with wireless broadband internet access through the network module 102, for example, helping the user to send or receive an email, to browse a web page, or to access streaming media.

The audio output unit 103 may convert audio data received by the radio frequency unit 101 or the network module 102 or stored in the memory 109 into an audio signal and output the audio signal as a sound. In addition, the audio output unit 103 may further provide audio output (for example, a call signal received sound or a message received sound) related to a specific function performed by the terminal device 100. The audio output unit 103 includes a speaker, a buzzer, a receiver, and the like.

The input unit 104 is configured to receive an audio signal or a video signal. The input unit 104 may include a graphics processing unit (GPU) 1041 and a microphone 1042. The graphics processing unit 1041 processes image data of a static picture or a video obtained by an image capture apparatus (for example, a camera) in an image capture mode or a video capture mode. A processed image frame may be displayed on the display unit 106. The image frame processed by the graphics processing unit 1041 may be stored in the memory 109 (or another storage medium) or transmitted by using the radio frequency unit 101 or the network module 102. The microphone 1042 is capable of receiving sounds and processing such sounds into audio data. The processed audio data can be converted into a format output that can be transmitted to a mobile communication base station through the radio frequency unit 101 in a telephone call mode.

The terminal device 100 further includes at least one sensor 105, for example, an optical sensor, a motion sensor, and other sensors. Specifically, the optical sensor includes an ambient light sensor and a proximity sensor. The ambient light sensor may adjust brightness of a display panel 1061 based on intensity of ambient light. When the terminal device 100 moves near an ear, the proximity sensor may disable the display panel 1061 and/or backlight. As a type of motion sensor, an accelerometer sensor may detect magnitudes of accelerations in all directions (usually three axes), may detect a magnitude and a direction of gravity when the terminal is in a static state, and may be applied to posture recognition of the terminal device (for example, landscape/portrait mode switching, a related games, or magnetometer posture calibration), functions related to vibration recognition (for example, a pedometer or tapping), or the like. The sensor 105 may further include a fingerprint sensor, a pressure sensor, an iris sensor, a molecular sensor, a gyroscope, a barometer, a hygrometer, a thermometer, or an infrared sensor. Details are not described herein.

The display unit 106 is configured to display information input by the user or information provided to the user. The display unit 106 may include the display panel 1061. The display panel 1061 may be configured in a form of a liquid crystal display (LCD), an organic light-emitting diode (OLED), or the like.

The user input unit 107 may be configured to receive entered numerical or character information, and generate key signal input that is related to user setting and function control of the terminal device 100. Specifically, the user input unit 107 includes a touch panel 1071 and other input devices 1072. The touch panel 1071, also referred to as a touchscreen, may capture a touch operation performed by a user on or near the touch panel (for example, an operation performed by the user on the touch panel 1071 or near the touch panel 1071 by using a finger or any appropriate object or accessory such as a stylus). The touch panel 1071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 110, receives a command transmitted by the processor 110, and executes the command. In addition, the touch panel 1071 may be implemented in a plurality of forms, for example, as a resistive, capacitive, infrared, or surface acoustic wave touch panel. In addition to the touch panel 1071, the user input unit 107 may further include other input devices 1072. Specifically, the other input devices 1072 may include but are not limited to a physical keyboard, a function key (such as a volume control key or a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides a corresponding visual output on the display panel 1061 based on the type of the touch event. In FIG. 7, the touch panel 1071 and the display panel 1061 serve as two separate components to implement input and output functions of the terminal device 100. However, in some embodiments, the touch panel 1071 and the display panel 1061 may be integrated to implement the input and output functions of the terminal device 100. This is not specifically limited herein.

The interface unit 108 is an interface for connecting an external apparatus to the terminal device 100. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 108 may be configured to receive an input (for example, data information or power) from an external apparatus and transmit the received input to one or more elements within the terminal device 100, or may be configured to transmit data between the terminal device 100 and the external apparatus.

The memory 109 may be configured to store software programs and various data. The memory 109 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 109 may include a high-speed random access memory, and may further include a non-volatile memory such as a disk storage device, a flash memory device, or another volatile solid-state storage device.

The processor 110 is a control center of the terminal device 100, uses various interfaces and lines to connect all parts of the entire terminal device 100, and performs various functions and data processing of the terminal device 100 by running or executing the software program and/or module stored in the memory 109 and invoking data stored in the memory 109, thereby performing overall monitoring on the terminal device 100. The processor 110 may include one or more processing units. Optionally, the processor 110 may integrate an application processor and a modem processor. The application processor mainly processes an operating system, a user interface, an application program, and the like. The modem processor mainly processes wireless communication. It can be understood that the modem processor may alternatively be not integrated in the processor 110.

The terminal device 100 may further include a power supply 111 (for example, a battery) that supplies power to the components. Optionally, the power supply 111 may be logically connected to the processor 110 by using a power management system, so as to implement functions such as charging management, discharging management, and power consumption management by using the power management system.

In addition, the terminal device 100 includes some functional modules that are not illustrated. Details are not described herein.

Optionally, an embodiment of this disclosure further provides a terminal device, including a processor, a memory, and a computer program stored in the memory and capable of running on the processor. When the computer program is executed by the processor, the procedures of the data transmission method in the foregoing embodiment are implemented, with the same technical effects achieved. To avoid repetition, details are not described herein again.

An embodiment of this disclosure further provides a computer-readable storage medium, where the computer-readable storage medium stores a computer program, and when the computer program is executed by a processor, the plurality of procedures of the data transmission method in the foregoing embodiment are implemented, with the same technical effects achieved. To avoid repetition, details are not described herein again. For example, the computer-readable storage medium includes a read-only memory (ROM), a random access memory (RAM), a magnetic disk, an optical disc, or the like.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or a part contributing to the prior art may be implemented in a form of a software product. The computer software product is stored in a storage medium (for example, a ROM/RAM, a magnetic disc, or an optical disc), and includes several instructions for instructing a terminal Device (which may be a mobile phone, a computer, a server, an air conditioner, a network device, or the like) to perform the methods described in the plurality of embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A data transmission method, applied to user equipment (UE), wherein the method comprises:
    in a dual-connectivity mobility management procedure, performing a target operation on first uplink data according to first information; wherein
    the target operation comprises: in a case that the first information is used to indicate that a first path is capable of transmitting the first uplink data, transmitting the first uplink data on the first path, a data type of the first uplink data comprises any one of: a Packet Data Convergence Protocol (PDCP) layer data packet, a PDCP layer control packet, or PDCP layer data; and
    in a case that a PDCP entity of the UE buffers second data and third data, that the second data is data transmitted through the first path, and that the third data is data transmitted through the second path, the method further comprises:
    transmitting second information to a Media Access Control (MAC) entity corresponding to the first path and transmitting third information to a MAC entity corresponding to the second path by the PDCP entity of the UE; or
    transmitting second information to a MAC entity corresponding to the first path by the PDCP entity of the UE; wherein the second information is used to indicate a data amount of the second data, and the third information is used to indicate a data amount of the third data, the second data is the PDCP layer data, the third data is the PDCP layer data,
    the first path is a target path between the UE and a target cell, and the second path is a source path between the UE and the source cell.

2. The data transmission method according to claim 1, wherein the data transmission method further comprises:
    in a case that the first information is used to indicate that the second path is incapable of transmitting the first uplink data, skipping transmitting the first uplink data on the second path, wherein the first information is specifically used to indicate that no uplink resources can be allocated to a target channel for the second path.

3. The data transmission method according to claim 2, wherein the target channel comprises a logical channel for a data bearer of the source path and/or a logical channel for a signaling bearer of the source path.

4. The data transmission method according to claim 2, wherein before the performing a target operation on first uplink data according to first information, the method further comprises:
    in a case that a transmission path for the first uplink data has changed to the first path, allocating no uplink resources to the target channel for the second path according to a target uplink grant; wherein
    the target uplink grant is used to indicate an uplink resource for the second path.

5. The data transmission method according to claim 4, wherein the allocating no uplink resources to a target channel for the second path according to a" comprises:
    allocating, by the MAC entity of the UE, no uplink resources to the target channel for the second path according to the target uplink grant.

6. The data transmission method according to claim 2, wherein before the performing a target operation on first uplink data according to first information, the method further comprises:
    in a case that the UE receives a mobility management command, marking the first path as a path capable of transmitting the first uplink data, and/or marking the second path as a path incapable of transmitting the first uplink data; wherein
    the first path is a path capable of transmitting the first uplink data by default, and the second path is a path incapable of transmitting the first uplink data by default.

7. The data transmission method according to claim 1, wherein before the performing a target operation on first uplink data according to first information, the method further comprises:
    in a case that a transmission path for the first uplink data has changed, marking the first path as a path capable of transmitting the first uplink data, and/or marking the second path as a path incapable of transmitting the target uplink data; wherein
    the first path is a path previously incapable of transmitting the first uplink data, and the second path is a path previously capable of transmitting the first uplink data.

8. The data transmission method according to claim 6, wherein
    the marking the first path as a path capable of transmitting the first uplink data comprises:
    marking, by the PDCP entity of the UE, the first path as a path capable of transmitting the first uplink data; and
    the marking the second path as a path incapable of transmitting the first uplink data comprises:
    marking, by the PDCP entity of the UE, the second path as the path incapable of transmitting the first uplink data.

9. The data transmission method according to claim 1, wherein the transmitting the first uplink data on the first path comprises:
    after the PDCP entity of the UE receives an uplink data transmission indication from an lower layer entity, transmitting the first uplink data on the first path.

10. The data transmission method according to claim 1, wherein after the dual-connectivity mobility management procedure, the method further comprises:
    in a case that the PDCP entity of the UE receives no uplink data transmission indication from an lower layer entity, transmitting the first uplink data on the first path; wherein
    the after the dual-connectivity mobility management procedure comprises any one of: successful completion of a random access to the target cell, completion of a handover, completion of an SCG change, and release by the UE of a connection with the source cell.

11. The data transmission method according to claim 1, wherein the PDCP layer data packet is a PDCP layer data packet of a data bearer; and/or the PDCP layer data packet is a PDCP layer control packet of a data bearer; and/or the PDCP layer data packet is PDCP layer data of a data bearer.

12. A terminal device, comprising a processor, a memory, and a computer program stored in the memory and capable of running on the processor, wherein when the computer program is executed by the processor, the processor implements:
in a dual-connectivity mobility management procedure, performing a target operation on first uplink data according to first information; wherein
the target operation comprises: in a case that the first information is used to indicate that a first path is capable of transmitting the first uplink data, transmitting the first uplink data on the first path, a data type of the first uplink data comprises any one of: a Packet Data Convergence Protocol (PDCP) layer data packet, a PDCP layer control packet, or PDCP layer data; and
in a case that a PDCP entity of the UE buffers second data and third data, that the second data is data transmitted through the first path, and that the third data is data transmitted through the second path, the processor further implements:
transmitting second information to a Media Access Control (MAC) entity corresponding to the first path and transmitting third information to a MAC entity corresponding to the second path by the PDCP entity of the UE; or
transmitting second information to a MAC entity corresponding to the first path by the PDCP entity of the UE; wherein the second information is used to indicate a data amount of the second data, and the third information is used to indicate a data amount of the third data, the second data is the PDCP layer data, the third data is the PDCP layer data,
the first path is a target path between the UE and a target cell, and the second path is a source path between the UE and the source cell.

13. The terminal device according to claim 12, wherein when the computer program is executed by the processor, the processor further implements:
in a case that the first information is used to indicate that the second path is incapable of transmitting the first uplink data, skipping transmitting the first uplink data on the second path, wherein the first information is specifically used to indicate that no uplink resources can be allocated to a target channel for the second path.

14. The method according to claim 13, wherein the target channel comprises a logical channel for a data bearer of the source path and/or a logical channel for a signaling bearer of the source path.

15. The terminal device according to claim 13, wherein before the performing a target operation on first uplink data according to first information, the method further comprises:
in a case that a transmission path for the first uplink data has changed to the first path, allocating no uplink resources to the target channel for the second path according to a target uplink grant; wherein
the target uplink grant is used to indicate an uplink resource for the second path.

16. The terminal device according to claim 15, wherein the allocating no uplink resources to a target channel for the second path according to a target uplink grant comprises:
allocating, by the MAC entity of the UE, no uplink resources to the target channel for the second path according to the target uplink grant.

17. The terminal device according to claim 12, wherein before the performing a target operation on first uplink data according to first information, the processor further implements:
in a case that the UE receives a mobility management command, marking the first path as a path capable of transmitting the first uplink data, and/or marking the second path as a path incapable of transmitting the first uplink data; wherein
the first path is a path capable of transmitting the first uplink data by default, and the second path is a path incapable of transmitting the first uplink data by default.

18. A non-transitory computer-readable storage medium, wherein the computer-readable storage medium stores a computer program, and when the computer program is executed by a processor, the processor implements:
in a dual-connectivity mobility management procedure, performing a target operation on first uplink data according to first information; wherein
the target operation comprises: in a case that the first information is used to indicate that a first path is capable of transmitting the first uplink data, transmitting the first uplink data on the first path, a data type of the first uplink data comprises any one of: a Packet Data Convergence Protocol (PDCP) layer data packet, a PDCP layer control packet, or PDCP layer data; and
in a case that a PDCP entity of the UE buffers second data and third data, that the second data is data transmitted through the first path, and that the third data is data transmitted through the second path, the processor further implements:
transmitting second information to a Media Access Control (MAC) entity corresponding to the first path and transmitting third information to a MAC entity corresponding to the second path by the PDCP entity of the UE; or
transmitting second information to a MAC entity corresponding to the first path by the PDCP entity of the UE; wherein the second information is used to indicate a data amount of the second data, and the third information is used to indicate a data amount of the third data, the second data is the PDCP layer data, the third data is the PDCP layer data,
the first path is a target path between the UE and a target cell, and the second path is a source path between the UE and the source cell.

19. The non-transitory computer-readable storage medium according to claim 18, wherein when the computer program is executed by the processor, the processor further implements:
in a case that the first information is used to indicate that the second path is incapable of transmitting the first uplink data, skipping transmitting the first uplink data on the second path, wherein the first information is specifically used to indicate that no uplink resources can be allocated to a target channel for the second path.

20. The non-transitory computer-readable storage medium according to claim 19, wherein the target channel comprises a logical channel for a data bearer of the source path and/or a logical channel for a signaling bearer of the source path.

* * * * *